United States Patent
Yang (10) Patent No.: US 8,160,561 B2
(45) Date of Patent: *Apr. 17, 2012

(54) CONFIGURABLE AND PUSHABLE CARRIER COMMUNICATIONS WITH RICH CONTENT

(75) Inventor: Lianghua Yang, Kitchener (CA)

(73) Assignee: Motorola Mobility, Inc., Libertyville, IL (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/435,594

(22) Filed: May 5, 2009

(65) Prior Publication Data

US 2009/0215445 A1 Aug. 27, 2009

Related U.S. Application Data

(63) Continuation of application No. 11/082,655, filed on Mar. 18, 2005, now Pat. No. 7,548,747.

(51) Int. Cl.
*H04M 3/00* (2006.01)
(52) U.S. Cl. .................. 455/418; 455/426.1; 455/466; 358/1.15
(58) Field of Classification Search .................. 455/418, 455/466, 426.1; 358/1.15
See application file for complete search history.

(56) References Cited

U.S. PATENT DOCUMENTS

| | | | |
|---|---|---|---|
| 6,039,624 A | 3/2000 | Holmes | |
| 6,097,942 A | 8/2000 | Laiho | |
| 7,324,838 B2 * | 1/2008 | Tarle | 455/566 |
| 7,830,539 B2 * | 11/2010 | Yajima et al. | 358/1.15 |
| 2001/0044310 A1 | 11/2001 | Lincke | |
| 2002/0111146 A1 * | 8/2002 | Fridman et al. | 455/99 |
| 2002/0124069 A1 | 9/2002 | Hatalkar | |
| 2002/0129095 A1 | 9/2002 | Hatalkar | |
| 2003/0016632 A1 | 1/2003 | Refai et al. | |
| 2004/0013246 A1 * | 1/2004 | Back et al. | 379/88.17 |
| 2004/0148090 A1 | 7/2004 | Melen | |
| 2005/0118991 A1 | 6/2005 | Koganti et al. | |
| 2005/0119031 A1 * | 6/2005 | Spalink et al. | 455/566 |
| 2005/0228853 A1 | 10/2005 | Yamamura et al. | |
| 2005/0282531 A1 * | 12/2005 | Andreasson | 455/418 |

FOREIGN PATENT DOCUMENTS

| | | |
|---|---|---|
| EP | 1182845 A2 | 2/2002 |
| WO | 2004081702 A2 | 9/2004 |

OTHER PUBLICATIONS

Motorola 1998: "Roaming Notification and Local Service Control through Short Message Service" by Kamala Urs. XP-A-781004.
Andreadis A. et al: "Analysis of downlink scheduling for web traffics in 2G and 2.5G mobile networks", Personal, Indoor and Mobile Radio Communications, 2002, The 13th IEEE International Symposium on Sep. 15-18, 2002, Piscataway, NJ, USE, IEEE, vol. 2, Sep. 15, 2002, pp. 794-798, XPO10614334 ISBN: 0-7803-7589-0 "abstract".

* cited by examiner

*Primary Examiner* — Danh Le (57) ABSTRACT

Apparatus, methods, data structures, and computer programming for the display on mobile wireless communications devices of information without the authorization or control of administrative servers. Displayed information can include, for example, carrier logos, news, and advertisements presented at the initiative of local service providers or other third-party systems. The local service providers or other parties are enabled to control the location and manner of the displays, as well as the content of data displayed. Providing control over the display to the local service provider enables, among other advantages, the transmission and display of much richer content, in more flexible manner than has heretofore been possible, including static and dynamic graphic images. The Application can be particularly useful in GSM, GPRS, EDGE, and UMTS systems.

20 Claims, 4 Drawing Sheets

CONFIGURABLE AND PUSHABLE CARRIER COMMUNICATIONS WITH RICH CONTENT

CROSS-REFERENCE TO RELATED APPLICATION

This is a divisional of U.S. patent application Ser. No. 11/082,655, filed Mar. 18, 2005, the contents of which are incorporated herein by reference.

BACKGROUND OF THE APPLICATION

The Application relates to wireless communications, and more particularly to methods, apparatus, and data structures for communicating data to wireless communications devices.

Mobile wireless communication devices such as hand-held or palm-top computers and cell phones are coming into increasingly widespread use. A large part of their usefulness, and therefore their popularity, derives from their portability. This is particularly true as the useful portability, i.e., the effective range, of such devices has been extended across states and provinces, regions, countries, and even oceans and continents. Extensions of the useful ranges of mobile wireless devices has been greatly facilitated by the use of communications networks as communications links for the wireless devices, both in linking them with other wireless devices and in linking them with devices such as telephones and personal computers linked, often by hard-wired connections, to public and private communications networks such as local area networks (LANs), the internet, and public switched-telephone systems.

A very powerful model for communications networks used with mobile wireless communications devices has been the administrative server—wireless device client architecture. In such networks one or more administrative servers, which commonly comprise powerful computer systems, are used to control communications and administrative functions such as accounting for large groups of client wireless devices. Typically, a particular mobile device is associated with a single administrative server for purposes of billing, accounting, etc., and wirelessly communicates with the server, and with other communications devices, through the use of formatted radio or other electromagnetic signals.

Because the effective range across the surface of the earth of most radio and other electromagnetic signals suitable for use in wireless communications is limited, and users of wireless devices find it advantageous to be able to communicate from arbitrary ranges and locations, it has been found efficient to use various forms of relays in maintaining communications between mobile communications devices and their servers. One particularly effective model for providing such relays has been the use of local wireless service providers. Local wireless service providers commonly provide communications links between mobile wireless communications devices permanently or temporarily located in areas served the service providers, and via various networks and/or systems of networks, as needed, the administrative servers associated with the mobile wireless devices. For example, a message sent from a mobile wireless device in a given area may be received by a local wireless service provider, which can relay the message, via wired or wireless link, to a server to which the device is assigned, or with which it is otherwise associated, beyond the range of wireless transmissions available at the time to the mobile wireless device. Likewise, a message from the server to the mobile device may be relayed by one or more local wireless service providers to the mobile device. Thus the use of such local service providers, particularly in geographically-extended networks, can effectively provide limitless ranges and coverage for mobile wireless devices. For this and other reasons, local service providers form an important part in wireless communications networks.

In order to provide continuous and competitive service over broad geographic areas, large numbers of local service providers have been established. This has enabled users of mobile wireless devices to move from location to location while remaining in continuous contact with their administrative servers, as well as with other communication devices.

For example, in a typical network scheme a mobile wireless device may, upon being turned on in an arbitrary location, establish contact with a local wireless service provider, identify itself and/or its administrative server to the local service provider, and establish and maintain communications with the server other devices, using the local service provider as a relay. Moreover, the mobile device can be moved from the area covered by that local service provider into an area covered by a second local service provider, establish contact with the second service provider, and maintain previous communications, or begin new communications, with other devices, using the second local service provider as a relay.

In many regions more than one local service provider is available to provide relay services for a given specific location. For example, in urban areas there often exist two or more competing services, either of which may be available to provide relay services for individual mobile devices. It can be possible, in such situations, for a user of a mobile device to select the local service provider the user wishes to use. In other instances, where pluralities of local service providers are available, selections for local coverage are made, as for example on a contract basis, by administrators associated the administrative server associated with each individual mobile device.

Because of the large number of local service providers available, the importance of the services they can provide, the great mobility of mobile communications devices, and other factors, there is a real and growing need for individual local service providers to be able to send messages created, or otherwise controlled or sponsored, by them to mobile communications devices for which they are providing relay or other communications services.

BRIEF DESCRIPTION OF THE FIGURES

The Application is illustrated in the figures of the accompanying drawings, which are meant to be exemplary and not limiting, and in which like references are intended to refer to like or corresponding parts.

DETAILED DESCRIPTION OF THE PREFERRED EMBODIMENTS

The ability of local wireless service providers acting as relays for mobile communications devices to provide to the mobile communications devices data originated by, or otherwise controlled or sponsored by, the local service providers has heretofore been quite limited. Indeed, in most cases such ability has not existed. For example, it is often desirable, even where it is not necessary, for local service providers providing services to mobile devices to be identified to the users of the mobile devices, as for example via the display of a logo associated with the local service provider on displays of the mobile communications devices. Heretofore data representing such logos has been provided outside the control of the local service provider, typically by or under the control of the administrative server, and sometimes even by the manufacturer of the mobile communications device. For example, a plain-font, monochromatic tradename designated or approved by the administrative server is transmitted by the server for relay to the mobile device; and the position and format in which it is displayed can be stored in fixed, non-volatile memory on a chip inside the mobile device at the time of manufacture, so that the logo is displayed in a manner specified by the administrative server, and cannot be changed or controlled by the local service provider.

Likewise, the highly desirable latent utility of local service providers as providers of other, richer, content, such as local news, weather, and time, including static and dynamic graphic images and emergency news and/or warnings, and to control the display of such content, has been untapped.

SUMMARY OF THE APPLICATION

The Application provides for the display on mobile wireless communications devices of information without regular circuit-switched voice call or packet-switched data call establishment, and without the authorization or control of administrative servers. Displayed information can include, for example, carrier logos, news, and advertisements presented at the initiative of local service providers or other third-party systems. The local service providers or other parties are enabled to control the location and manner of the displays, as well as the content of data displayed. Providing control over the display to the local service provider enables, among other advantages, the transmission and display of much richer content, in more flexible manner than has heretofore been possible.

The Application provides, for example, apparatus, methods, data structures, and computer programming useful for displaying data on mobile wireless communications devices administered by administrative servers, in systems comprising local wireless service providers. The local service providers can be useful in, for example, relaying or communicatively linking administrative servers and mobile wireless communications devices administered by the servers. The local service providers are adapted to receive from mobile wireless communications devices signal identifying the devices, and to provide to administrative servers associated with the respective mobile devices signals identifying the devices and requesting authentication of the devices. Conditioned upon receipt from the respective administrative servers of signals authenticating the devices, the local service providers classify the devices as members of one or more groups; and, conditioned upon classification of the devices as members of the one or more groups, access memory associated with the provider system and transmit to the devices for display by the devices data stored in the memory and addressed to the group(s). Data transmitted to the mobile devices to effect the display can comprise one or more of a size designation, a font designation, a color designation, and a display position designation; the at least one size designation, font designation, color designation, or display position designation being created, sponsored, or otherwise designated by the local service provider or another third party, with or without authorization of the respective administrative servers. Third parties can include, for example, news agencies, advertisers, group administrators, and others.

Data transmitted to the mobile wireless devices for display can include content such as, for example, carrier logos, tradenames, and/or other identifiers, news stories, advertisements, and/or other content. The content can include text and/or images, and is created, controlled, sponsored, or otherwise designated by the provider system, with or without authorization and/or control by the administrative server, for transmission to the mobile wireless devices. Data transmitted in accordance with the Application may be transmitted in conjunction with control or paging signals, or using communications resources which otherwise would go unused, and/or in other ways that increase the efficiency of communications.

Data structures according to the Application can include, among other features, fields of predetermined order(s) and format(s) for communicating, inter alia, data identifying wireless devices to which data forwarded by the local service provider is addressed; classes of type to which the data structures belong; fonts and font sizes to be used by the wireless devices in displaying text content communicated by the data structures; sizes and positions to be used in displaying text and/or graphic data on the wireless devices; colors to be used in displaying data on the wireless devices; and/or content to be displayed. Using such data structures, a local service provider is enabled to specify and/or control one or more of the content, position, and appearance of data provided by the local service provider on the wireless devices' displays.

The Application further provides computer programming and computer-implemented methods for implementing processes according to the Application, as described herein.

Additional aspects of the present Application will be apparent in view of the description which follows.

Preferred and alternative embodiments of methods, data structures, and apparatus according to the Application are described through reference to the Figures. The Figures are understood to be exemplary, and not limiting.

Figure 1:
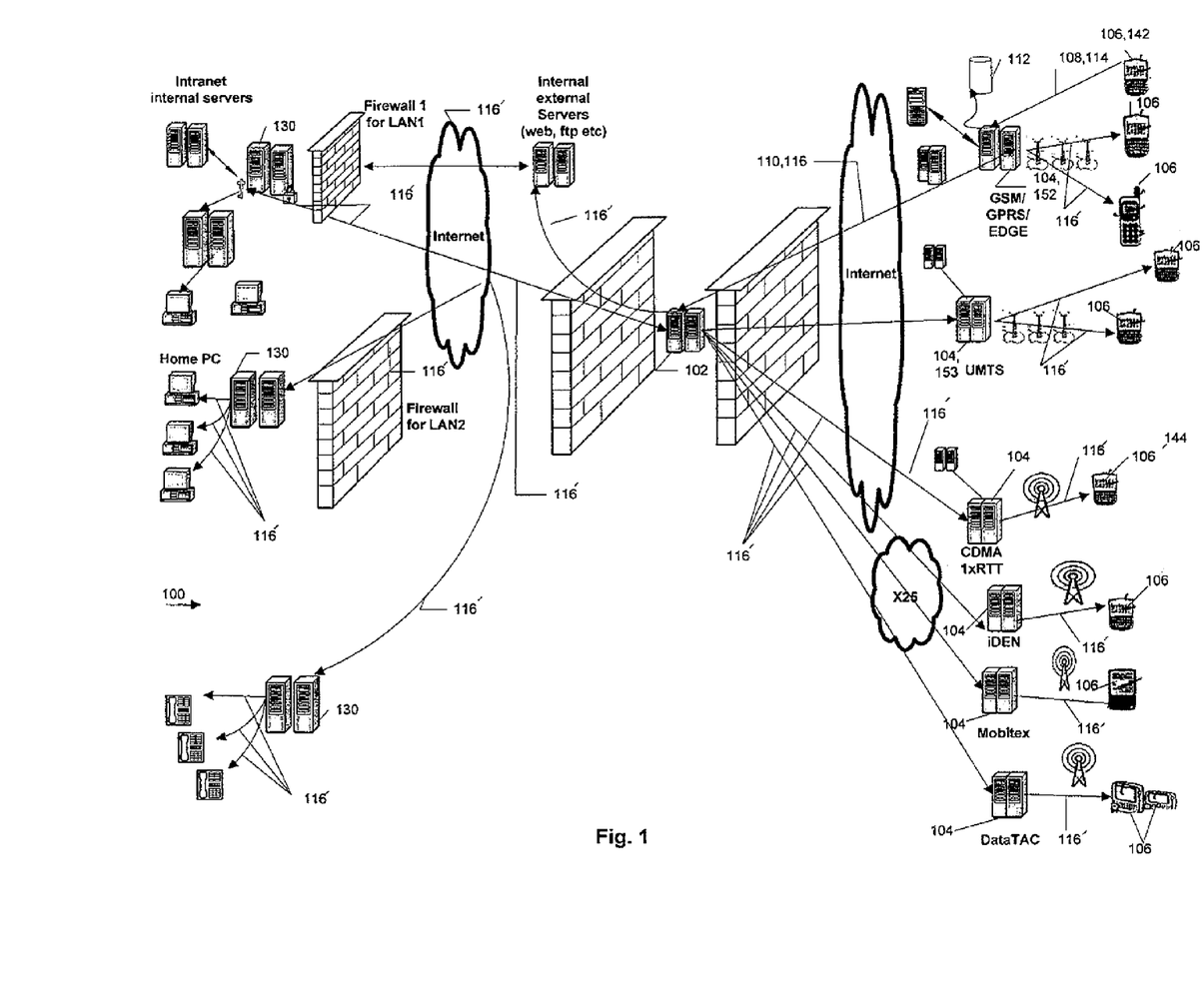
FIG. 1 is a schematic diagram of a wireless communication system comprising an apparatus suitable for displaying information on mobile wireless communications devices according to the Application.

FIG. 1 is a schematic diagram of wireless communication system comprising an apparatus suitable for displaying information on mobile wireless communications devices according to the Application. The apparatus shown in FIG. 1 is suitable, for example, for implementing a process of displaying information such as that shown schematically in FIG. 2.

Communications system or network 100 of FIG. 1 comprises one or more administrative servers 102, mobile wireless communications devices 106, and local wireless service providers 104. System 100 can also include one or more connections to further networks or communications devices 130 in order to further accommodate communications.

Administrative server(s) 102 provide any of a wide variety of administrative functions for mobile wireless devices 106, singly or in groups. Server(s) 102 can, for example, provide subscription, accounting, security, data storage, communications, and/or information processing services for individual and/or group users or accounts for mobile communications devices such as cellular telephones and hand-held devices such as palmtop computers and personal digital assistants (PDAs). Server(s) 102 can comprise any one or more processors, communications equipment, and other devices suitable for use in providing such functions.

Local wireless service provider systems 104 provide, among other functions, relay functions for communications signals sent between servers 102 and one or more mobile wireless devices 106. Local provider systems 104 comprise any one or more processors, communications equipment, and other devices suitable for use in providing such functions. Local wireless service provider systems 104 can comprise, for example, land- or water-based transmission stations coupled with transmission antennas, and/or satellite communications systems. It can be advantageous in implementing the Application to use pluralities of local service provider systems, under common or independent control, to provide, for example, extended effective ranges for wireless communications.

A wide variety of commercially-available computers and associated processors are suitable for use in implementing servers, local service provider systems, and other devices according to the Application. For example, relatively powerful mainframe computers available from IBM, Hewlett-Packard, and others will serve. A wide variety of less-powerful computers, such as personal or desktop model computers available from Apple, Hewlett-Packard, Compaq, Dell, and others will also serve, particularly where linked in distributed-processing systems or in smaller networks in which fewer mobile devices are to be administered or controlled.

Mobile wireless communications devices 106 can include any devices suitable for sending, receiving, displaying, and/or otherwise processing wireless communications in accordance with the disclosure herein. Such devices can include, for example, mobile communications devices such as cellular telephones, pagers, hand-held computing devices such as palmtop computers and personal digital assistants (PDAs), and enhanced electronic devices which combine features of one or more of such devices. Examples of currently commercially-available wireless communications devices suitable for use in implementing the Application include the Blackberry line of hand-held wireless devices produced by Research in Motion Limited, of Waterloo, Ontario, Canada.

Systems according to the Application may further comprise connections to further networks or communications devices 130. Connection to further devices 130 can include, for example, wired or wireless connections to private or public networks such as the Internet; corporate or private local- or wide-area networks (LANs or WANs), or electronic communications networks (ECNs), and to the public switched telephone network (PSTN). Such connections can facilitate, for example, communications between mobile wireless devices 106 and stand-alone or networked computers such as home or business data processing systems.

A wide variety of commercially-available communications equipment is suitable for use in facilitating communications, including wireless communications, between servers, local service provider systems, mobile wireless communications devices, and other devices in accordance with the Application. For example, a large number of suitable radio, infrared, and microwave transmitters, receivers, antennas, and amplifiers, as well as telephone communications switches, links, and other controllers are available, from a number of manufacturers. Wired and wireless communications systems are in general well understood, and the implementation of systems according to the Application using such devices will not trouble those of ordinary skill in the art, once they have been made familiar with this disclosure.

It will be appreciated that a wide variety of computer processors, communications equipment, and other devices suitable for use in implementing systems according to the Application will likely be hereafter developed, in addition to those commercially available and in use now. It is considered that any such newly-developed devices suitable for use in systems according to the Application are equivalent to currently-available devices.

It will further be appreciated that each of the systems and devices suitable for implementing systems according to the Application may include all hardware, software, and firmware necessary or desirable for accomplishing the purposes disclosed herein.

It will further be appreciated by those skilled in the art, once they have been made familiar with this disclosure, that the Application may be implemented using systems and devices such as those described herein to communicate according to a wide number of protocols, some of which are known and others of which will doubtless hereafter be developed. Such protocols include, for example, but are not limited to, one or more of the Global System for Mobile communication (GSM), Enhanced Data GSM Environment (EDGE), General Packet Radio Services (GPRS), Universal Mobile Telecommunications Service (UMTS), Code Division Multiple Access (CDMA), Time Division Multiple Access (TDMA), Integrated Digital Enhanced Network (iDEN), Mobitex, and DataTAC™ protocols. Several of the specific embodiments disclosed herein are particularly well suited to implementation in systems operating according to the GSM, GPRS, and/or UMTS protocols. In all cases, however, it is contemplated that the Application may be implemented in systems employing any one or more suitable protocols, whether now existent or to be developed in the future.

In general, system 100 of FIG. 1 is adapted for processing communications between one or more mobile wireless devices 106 and administrative servers 102. For example, a user of a mobile wireless communications device 142 such as that shown in FIGS. 3 and 4 wishing to communicate with the user of another mobile wireless device 144 can prepare an e-mail using input-output devices such as keypad 58, display 38, and switches 50, 54, using, for example, known methods of entering data entry and data processing, such as those known and implemented for communications using a Blackberry mobile wireless communications device. Data representing the contents and one or more addressees, including for example both the ultimate intended addressee and, either by express or implicit designation, an identifier representing the administrative server 102 associated with mobile device 142 and/or the user of device 142, may be created and held in memory on board the mobile device 142, for example, in either or both of Ram 70 and persistent storage 74, under the control of processor 52.

Figure 3:
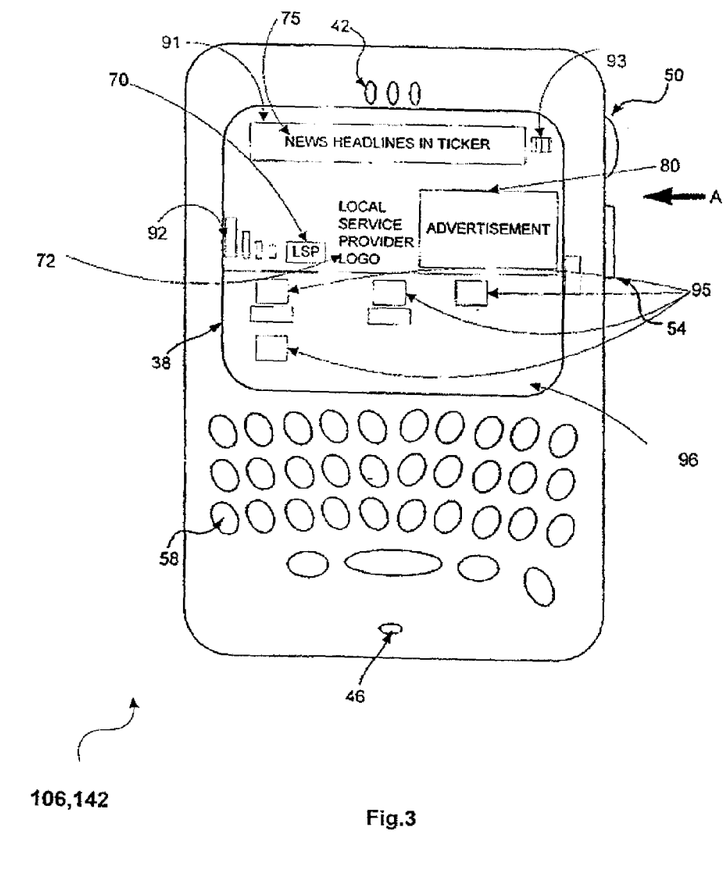
FIG. 3 is a schematic front view of a mobile wireless communications device suitable for use with apparatus according to the Application.
Figure 4:
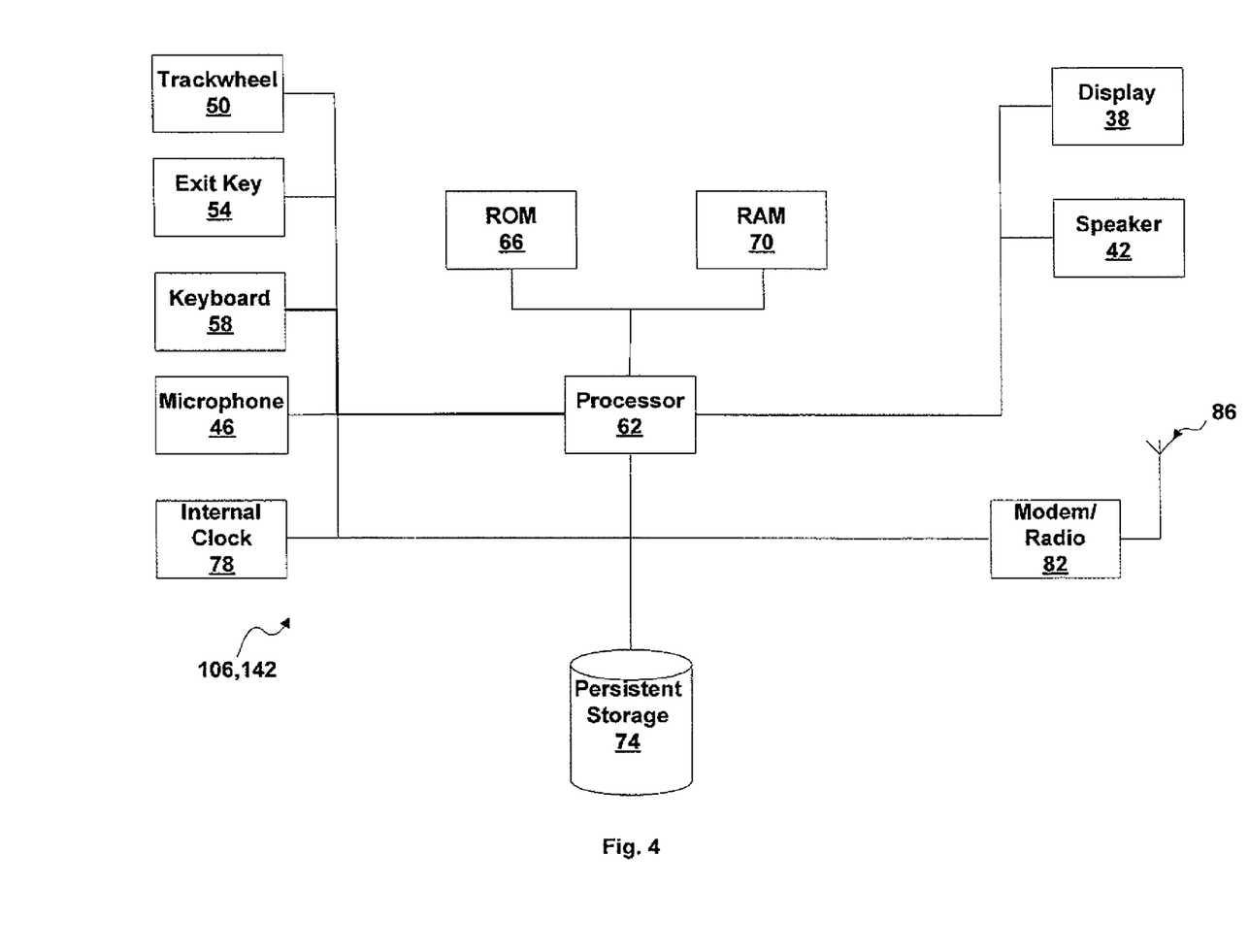
FIG. 4 is a functional block diagram of a mobile wireless communications device suitable for use with apparatus according to the Application.

Similarly, messages representing, for example, dialing codes, text messages, and/or speech intended to be used in establishing and/or maintaining wireless telephone conversations can be input using keypad 58 and/or microphone 46 and transmitted using modem/radio 82 under the control of processor 62.

When the e-mail or other communication is ready to be sent to the addressee(s), the user can input commands to cause processor 62 to transmit the message using modem/radio 82 and antenna 86. Transmitted message 114 can be received by local wireless service provider 152, and retransmitted (i.e., relayed) to administrative server 102, which maintains account information related to and/or otherwise administers communications by and with mobile device 142. For example, message 114 may be received by local service provider 152 and processed to include additional identifying information, such as for example an identifier representing local service provider 152, and transmitted as a relayed message 116.

Upon receipt of a relayed message 116, server 102 can read the intended addressee(s) for the message, consult a database indicating the appropriate local service provider(s) for relaying the messages to the addressee(s), and forward (i.e., relay) the message 116' appropriately. As will be apparent to those skilled in the relevant arts, intended addressees for the message 114 can include one or more other mobile communications devices 106 and/or devices 130. Thus message(s) 116' can be forwarded to the same or other local wireless service providers 104 and/or other communications devices 130. Messages 116' forwarded to local wireless service providers 104 may be relayed via radio or other wireless signal to one or more mobile wireless devices 106.

It is noted that, in implementing communications networks according to the Application, chains comprising one or more local service providers 104 in series or in parallel can be employed in relaying messages between server 102 and one or more mobile devices 106 and/or other devices 130. That is, more than one local service provider 104, 152, 153 may be used to relay messages between a given mobile device 106, 142 and a server 102, and/or between a server 102 and one or more of devices 106, 130. It is further noted that communications between local service providers 104, servers 102, and/or other devices 130 may be by any suitable means, including wireless and/or wired transmission over, for example, the public switched telephone network. The employment of such chains of local service providers can, for example, be used to significantly extend the effective range of communications using mobile wireless communications devices 106.

As noted, a large part of the usefulness of mobile wireless communications systems such as apparatus 100 derives from the portability of mobile devices 106 facilitated by the use of pluralities of local service providers 104. A user of a device 142 can, for example, move geographically, as for example by foot or automobile conveyance, away from an area in which her device 142 is within range suitable for communications with a first service provider 152, into an area in which her device 142 may communicate more effectively with a second service provider 153, located for example in a different region. The user's device 142 can be configured so as to automatically or upon command establish communications the second local service provider 153, and thus maintain communications with her respective administrative server 102, regardless of their relative locations.

For example, device 142 can be configured, using suitable programming, firmware, or other means, to periodically or occasionally send a check signal or status query or report on an agreed or specified radio frequency, regardless of location. The check signal may be received by a local service provider 104, 152, 153 monitoring the agreed frequency. Upon receipt of the check signal, the receiving local service provider 104, 152, 153 can transmit to the mobile device 142 a message requesting any further suitable data, such as identifiers associated with the mobile device 142 and an administrative server 102 associated with the mobile device 142; and can send a message to the server 102 identifying the mobile device 142 and requesting authentication of a relationship between the server 102 and mobile device 142. Upon receipt of a signal from the respective server 102 authenticating the identity of the mobile device 142 and the relationship between device 142 and server 102, the local service provider 104 can relay any desired communications between the device 142 and the server 102.

Such functionality enables the user of a device 106 to move freely within areas covered by any local service providers 104 while maintaining communications with administrative server 102 and any other mobile devices 106 and/or devices 130.

Similar functionality may be used to maintain communications between mobile devices 106 and a server 102 in the event of a change of local service providers 104 for any other reason, as for example due to power outage or other service interruption, and/or changes in contractual relations between the server 102 and local service providers 104.

Figure 2:
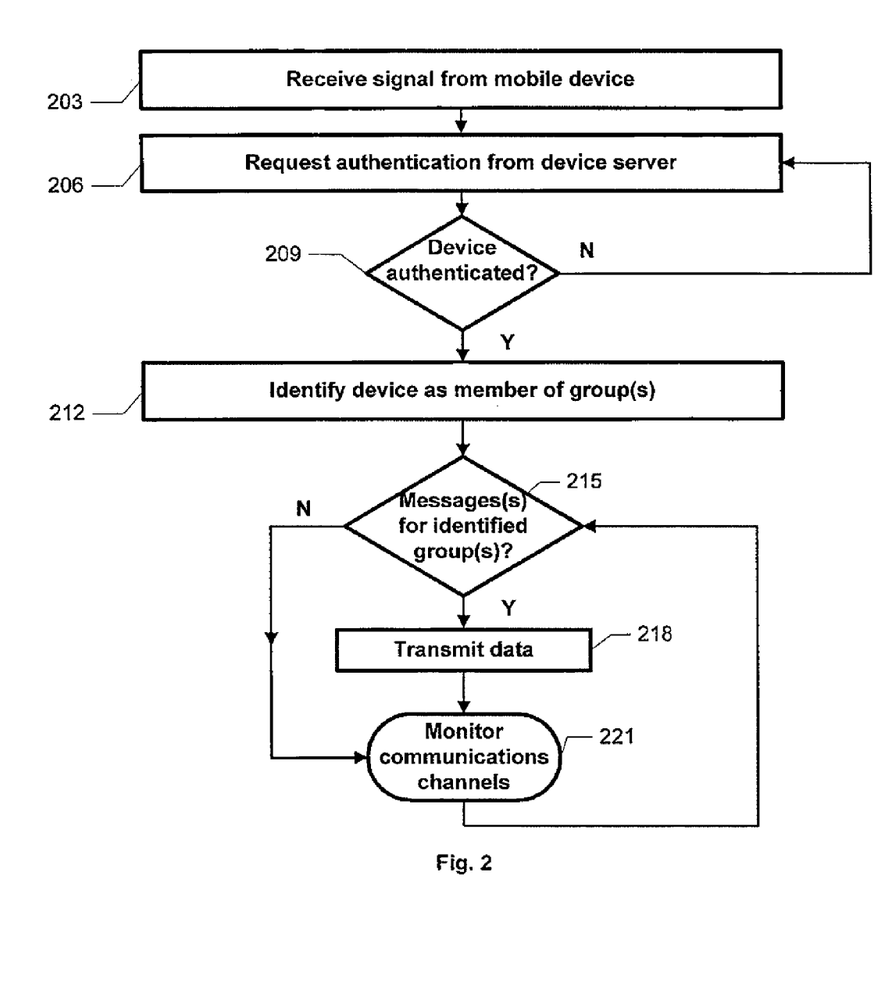
FIG. 2 is a schematic flow diagram of a method suitable for displaying information on mobile wireless communications devices according to the Application.

FIG. 2 is a schematic flow diagram of a method suitable for displaying information on mobile wireless communications devices according to the Application. Method 200 is suitable for implementation by, for example, a network such as apparatus 100 of FIG. 1, and is described in relation thereto. As will be readily understood by those having ordinary skill in the relevant arts, however, any apparatus suitable for implementing the functions described in FIG. 2 will serve.

At 203 a local service provider 104 receives a signal 108 transmitted or otherwise provided by a mobile wireless communications device 106. For example, the mobile device 106 transmits a check signal formatted in accordance with an accepted protocol and comprising data identifying both the mobile device 106 and an administrative server 102 associated with the mobile device 106. Any means of identifying a relationship between the mobile device 106 and server 102 will serve. For example, the message 108 can alternatively identify mobile unit 106 only, and local service provider can query a table, database, or agreed list of identifiers identifying such relationships. Such databases may be maintained, for example, by local service provider 104 using an associated memory 112, or by any other suitable means or device, accessible at any point on the network 100.

At 206 the local service provider 104 transmits or otherwise provides to the server 102 identified by or otherwise associated with the mobile device 106 a signal 110 identifying the device 106 and requesting authentication of the device 106, as by example a request for a signal expressly or implicitly indicating that a relationship exists between the device 106 and the server 102. For example, the local service provider 104 can request an explicit confirmation of the relationship, or it can implicitly request a mere acknowledgement, which can be interpreted as a confirmation. Signal 110 can include data identifying the local service provider 104 providing the request for use, for example, by server 102 in monitoring and/or maintaining communication with the device 106. Optionally either one or both of sever 102 and local service provider 104 can maintain data records indicating the current association of the device 106 with the local service provider 104 and/or the server 106, so as to expedite future communications, for so long as the device 106 maintains contact with the local service provider 104. Upon relocation of the device 106 and establishment of communication by device 106 with server 102 via second local service provider 153, for example, the process can be repeated, and a data record identifying the current status of the device 106 as using the second local service provider 153 as a communications relay can be suitably modified or replaced.

At 209 the local service provider 104 determines whether the device 106 from with the signal was received at 203 has been authenticated by a server 102. If the device has not been authenticated, the local service provider 104 can wait for an additional period of time and/or can immediately make a new request for authentication. For example, upon the sending at 206 of a request for authentication of the device 106, the local service provider 104 can create a data record associated with device 106, as for example a formatted data record comprising a field containing data identifying the device 106, and in creating the data record may provide a field for a flag indicating whether the device has been authenticated by an administrative server. Thereafter at a predetermined time or in a predetermined phase of a monitoring process the local service provider 104 can determine whether the flag has been set to indicate that data has been received from an administrative server 102 to authenticate the device.

If at 209 it is determined that the device has been authenticated, as for example upon receipt from the administrative server 102 of a signal authenticating the device and corresponding setting or resetting of a flag in a suitable data record, at 212 the local service provider 104 can classify the device as a member of one or more groups. For example, upon receipt of a signal from administrative server 102 indicating that mobile device 106 is authorized for communication with server 102, the device 106 may be identified by the local service provider 104 as belonging to a group of subscribers to an administrative service provided by server 102, or to a group of devices 106 with which local service provider 104 is authorized to communicate. For example, a formatted data record comprising an identifier of the device 106 can be provided with a flag or field indicating that the device is authorized to communicate with or receive communications from the administrative server 102, and the data record can be stored by the local service provider in volatile and/or persistent memory. The mobile device 106 may further be identified, as for example through the use of data provided by administrative server 102, as also belonging to a subclass of devices, as for example a subscriber to a particular service offered by server 102. The mobile device 106 further be identified as a member of a group or groups specified or defined by local service provider 104. For example, mobile device 106 may be identified, using suitable data written to a data field in a record associated with the mobile device, as belonging to a class of devices, such as "hand-held processor", or "mobile telephone," or "pager", for which local services are currently being provided by the local service provider. Thus, for example, conditioned upon receipt from the administrative server 102 of a signal authenticating the device 106, the local service provider 104 can classify the device 106 as a member of a group.

At 215 the local service provider 104 determines whether the service provider 104 is holding or has otherwise identified any messages or other signals for provision to members of the group(s) to which the mobile device 106 has been identified as belonging. For example, upon determining at 212 that device 106 belongs to one or more groups, local service provider 104 can create or modify a suitable data record to include or otherwise be associated with identifiers for the identified groups(s), and thereafter access and search a database of prepared messages or other signals for messages containing corresponding data fields, or otherwise associated with the respective identifiers.

If at 215 any message(s) have been identified as intended for provision to the group(s) with which the device 106 is associated, at 218 the local service provider 104 can transmit or otherwise provide the data corresponding to the message to the mobile device 106. For example, data stored in memory associated with the local service provider 104 (e.g., memory 212) can be accessed and broadcast by local service provider 104 over a suitable wireless channel, with identifiers and/or other data indicating that it is intended and authorized for interpretation and processing by the mobile device 106. Mobile device 106 can thereafter process the transmitted message for use by a user of the device 106, as for example by displaying the message on a screen of the mobile device 106.

Thereafter the local service provider can implement or return to a process of monitoring communications channels for signals to be relayed between mobile device 106 and administrative server 102, and can cycle periodically or upon command to the process at 215 of determining whether any messages are being held for the device 106. This can be beneficial, for example, when communications have previously been established with a device 106 and new messages have been prepared for broadcast to the device 106.

One of the particular advantages provided by the Application is control on the part of the local service provider 104 over both the content of messages transmitted to mobile devices 106 and the manner in which such messages can be displayed on the mobile devices 106. Thus for example data transmitted to device(s) 106 can comprise at least one of a size designation, a font designation, a color designation, a display position designation, and content; the at least one designation and/or any associated content created, stored, or otherwise designated for provision to the wireless device(s) 106 by the local service provider 104 without the authorization of the administrative server 102. Such data can comprise, for example, content originated by the local service provider or by a third party, for example a news service, advertiser, or group administrator. The data can be formatted, for example, according to a protocol including various data fields for various types of data.

Thus, conditioned upon classification of the device 106 as a member of one or more groups, the local service provider 104 can access memory associated with the provider system 104 and transmit to the device 106 data stored in the memory and addressed to the group, the data comprising at least one of a size designation, a font designation, a color designation, a display position designation, and a content; the at least one size designation, font designation, color designation, display position designation, and content designated without authorization by the administrative server.

An example of display by a mobile wireless communications 106 of data transmitted to the device 106 by a local service provider 104 is shown in FIG. 3. Four separate or related data displays, which may comprise data transmitted by the local service provider 104 and/or processed by the mobile device 106 as a single message or in any combination of pluralities of discrete messages, are shown displayed on screen 38. Displayed data comprise logo display or other identifier 70 associated with the local service provider 104 that provided the message. As shown, 70 comprises text data 72 and image data 71. Text data 72 can comprise, for example, ASCII characters identifying the local service provider by tradename or other designator. Image data 72 can comprise for example a graphical item associated with the local service provider, such as for example a graphic trademark design.

The displayed data shown in the exemplary illustration of FIG. 3 further shows an advertisement item 80, which can comprise any combination of text and/or graphic items representing, for example, static or dynamic content provided by the local service provider 104 on its own behalf or on behalf of other parties. For example, local service provider 104 can contract with other parties for the display of advertising content on mobile devices being served by the local service provider 104, and can transmit to one or more mobile devices 106 data comprising data representing images, for example, in jpeg, bitmap, or other format.

The displayed data shown in the exemplary illustration of FIG. 3 further shows a news display 75, which can comprise for example news and/or headlines related to current or coming events, including emergency warnings or alerts. News or other content displayed in a display 75 can be both generated and provided by a local service provider 104, or can be generated by other parties, such as news organizations or such as entities related to administrative server 102 or with the user of the mobile device 106, and transmitted by local service provider 104. For example, a local service provider 104 providing news content in a display 75 can contract with a news service for a data feed, and provide data received from the news service in the display 75.

Using suitable data structures, data provided by local service providers 104 to mobile devices 106 can be used to cause the display of information such as that shown in FIG. 4 on the mobile devices 106 to which it is provided in any desired manner. For example, using such data structures the local service provider can control any combinations of font, size, color, position, etc.; and content displayed can be static or dynamic. For example, data representing identifier 72 can be transmitted as a data file or data record comprising a number of fields in a defined format, as for example as set forth by a protocol, the fields comprising an identifier for the addressee or group of addressees to which the data is being transmitted, and one or more fields for specifying a font in which text content is to be displayed, as for example an identifier indicating that Times Roman or Arial font is to be used; an representing a font size to be used in displaying the data, as for example in 10, 12, or 14 point font, or in terms of a number of display pixel rows; and one or more colors in which the text or other content is to be displayed, as for example cyan, magenta, or black.

Local service provider 104 can also be used to specify a location upon a display screen 38 on which data provided by the local service provider 104 is to be displayed, as for example by including in data transmitted to the mobile device 106 one or more records indicating a relative position upon the data screen. For example, data comprising one or more points on the data screen, e.g. pixel row and column locations, in which image or text content is to be inserted into the display.

A particularly useful feature of the Application is to allow the local service provider 104 to provide to the mobile device(s) 106 content which is static or dynamic. For example, in the case of a logo or other identifier intended to identify the local service provider 104 as a source of wireless communications systems for the mobile device(s), it may be desired for a static display 72 to be provided in a status region of a display screen 38 for as long as the mobile device is provided with communications services by the local service provider. Static information may be provided by the local service provider together with data indicating that the information is to be stored or displayed indefinitely. For example, data transmitted by the local service provider can include a field indicating that the data is to be stored in volatile or persistent memory 66, 70, 74 on the mobile device(s) 106, as for example in accordance with an established communications protocol specified for use by one or more classes of mobile communications devices, until the data is modified or replaced by data representing an identifier by a second local service provider 104.

Such stored identifiers may be displayed, for example, in a status area of a display screen 38 at times when the status area is displayed. For example, in some embodiments of hand-held computation devices a status area 91 is displayed on a screen 38 at such times as no specific application is being executed by the hand-held device, as for example as part of a welcome or high-level application selection interface. Such a status area can comprise, for example, a signal strength indicator 92 indicating a present strength of a communications signal from the local service provider 104 currently serving the hand-held device 106; a battery life indicator 93 indicating an estimated remaining battery life for a power system of the hand-held device, and/or a time/date indicator 94. An interface display upon which such a status area is displayed can further include an application field 96 comprising, for example, a number of selectable items 95 useful for activating one or more applications stored on or otherwise accessible and executable by the hand-held device. Such applications can include, for example, word processors, e-mail applications, web browsers, contact information programs, and the like.

Display items 70, 75, 80 can also include dynamic information displays. For example, a local service provider 104 can transmit to one or more mobile device(s) 106 data files comprising animated images created using, for example, flash or other image-processing programming. Such data can be used, for example, to cause the mobile device(s) 106 to display advertising comprising animated images, and/or ticker-style news/headline displays.

An advantageous feature of the Application is the enablement of the combined control of data displays on mobile devices 106 by local service providers 104, administrative servers 102, and/or mobile devices 106 to which data is transmitted. For example, any one or more of the position, size, font, and/or color of displayed data may be specified by the administrative server 102 associated with a given mobile device 106, or by a user of the mobile device 106. The flexibility afforded by enabling the administrative server 102, the mobile device 106, and the local service provider 104 to share the ability to designate such parameters is a significant improvement over the prior art, in that each of the parameters has heretofore been specified solely by the administrative server 102.

By providing data in the manner described, the Application enables a local wireless service provider to provide mobile wireless communication devices as disclosed herein with configurable and pushable carrier logo and mobile headline bars with rich content capability for wireless communications.

The Application further provides data structures useful in implementing the processes and purposes described herein.

For example, a new data record "Logo/Headline Character Description" information element identity data structure (IEI) is provided. The IEI is useful, for example, in enabling a local service provider 104 to designate the manner in which data representing a logo or other identifier provided by the local service provider 104 to a mobile communications device 106 is displayed by the mobile device 106, by specifying, for example, the size, font style, color, etc., to be used in displaying the identifier. The IEI is compatible with other standard Layer 3 messages defined by European Telecommunications Standards Institute (ETSI) standard 04.08, sections 9 and 10). The Logo/Headline Character Description IEI comprises the following information elements, or data fields, within the data record:

{TYPE}: 1 octet, of ETSI Information Element (IE) Type =0×66, with Name="Logo Char Description". This IE is Optional (O), with TypeValue(TV) format.

{FONT} 1 octet for designation of the font to be used in displaying the data, e.g., 0×01=Roman, 02=NewTimes etc.

{POS-X} 1 octet representing a relative x-axis position of a reference point, e.g., the top left corner, of the designated display area 38, and {POS-Y} 1 octet, to be used in conjunction with {POS-X} in positioning the logo, e.g., with respect to the top left corner of a designated display region 38 of a screen of a mobile communications device 106. If LCD pixels are up to 256, POS-X,-Y can for example mean the pixel directly; if LCD has more than 256 pixel in x or y direction, the value can be rendered in relative terms, for example as (POS-X/256)*LCD_X_PIXELS, (POS-Y/256)*LCD_Y_PIXELS.

{SIZE_X} 1 octet designating, for example, what percentage of LCD panel physical width is to be occupied by a display of the whole Logo content. The mobile device 106 can the display information based on SIZE_X, SIZE_Y and actual pixel resolution; the normal range is, for example, 30%, 100%, etc., of LCD width.

{SIZE_Y} 1 octet designating, for example, what percentage of LCD panel physical height is to be occupied by a display of the whole Logo content. The mobile device 106 can render the displayed information based on SIZE_X, SIZE_Y and actual pixel resolution; the normal range is, for example, 5%, 50%, etc. of LCD height.

{COLOR} two semi-octets, one representing foreground color, the other background color; e.g. each comprising a code representing one of a set of 16 predefined colors.

{OTHER PROPERTIES} 1 octet, set by the local service provider 104 on the basis of bit-by-bit definition, such as bit0 for Bold, bit1 for Italic, with other data fields reserved for expansion.

As another example, a new data record "Logo/Mobile-Headline Picture" IEI is provided. The IEI is useful, for example, in enabling a local service provider 104 to designate the manner in which data representing a graphic image such as a pictorial logo or other image content provided by the local service provider 104 to a mobile communications device 106 is displayed by the mobile device 106, by specifying, for example, the size of a referenced image data set (for example, a reference to the size of a separately-stored image data file; or the length of a data string embedded within the IEI), the position in which the image is to be displayed on a display 38 of the mobile device 106, and the picture content. The IEI is compatible with other standard Layer 3 messages defined by European Telecommunications Standards Institute (ETSI) standard 04.08, sections 9 and 10). The Logo/Mobile-Headline Picture IEI comprises the following information elements, or data fields, within the data record:

{TYPE_LENGTH} 1 octet, of IE Type=0x6-, with Name="Logo Picture Description". This IE is Optional (O), of TypeLengthValue (TLV), 0x60-0x6F for 2-17 octets.

{Segment Sequence Number} 2 octets for designating the format of the associated image data, e.g., Bit0~bit9 for segment sequence number [0~1023]; bit10~bit13 for picture format identifier[0,15] (e.g., .jpeg, .pdf, .gif, .tif, etc.); bit14 for first segment or not; bit15 for last segment or not.

{X-POS}, {Y-POS} as described above; conditional presence only in first segment frame.

{Picture Data/Contents} up to 15 octets per frame as of valid picture data for data embedded in transmitted data record.

max picture size=15 bytes per frame×256=3840 bytes which should fit for most carriers' Logo requirement This format is suitable, for example, in transmitting either static or dynamic image files. For example, in a digital mobile telephone system according to the Global System for Mobile communication (GSM) standard, data representing dynamic images can be transmitted by local service providers 104 to mobile wireless devices 106 in a format of 120 ms/26 per frame×(51 frames per multiframe×P multiframe paging cycles)*256 paging cycles (where, for example, P=2, 3, 4, . . . 9, typical at 5), for a period of approximately 300 seconds. This can be accommodated on a single channel of a multiple-channel system according to GSM standards.

As will be immediately apparent to those of ordinary skill in the relevant arts, once they have been made familiar with this disclosure, similar data structures may be provided for the transmission of text content by substituting suitable text data fields for image data fields.

It can be advantageous, in practicing the Application, to make use of regular or predictable patterns in wireless communication traffic, and to make efficient use of available communications channels in multiple-channel systems. For example, larger data files representing, for example, more detailed or dynamic images, or large content files, can be sent during periods of low device usage, such as the middle of the night, early in the morning, and on weekends, and stored automatically on the mobile devices 106 for later processing and display; or they can be sent over either control or data channels, or any combinations thereof, when capacity is available, in order to manage communications loads in multiple-channel systems. This particular advantage can be extended, in accordance with the Application, to both local service providers 104 and/or servers 102.

For example, some currently-implemented wireless communications systems use designated digital paging channels for the transmission of formatted numeric messages. Under current protocols, the data records transmitted over such channels in some circumstances can provide relatively large capacity for transmission of data. For example, some systems comprising paging channels transmit "PCH Empty" messages or other empty space signals during periods when no paging communications are being transmitted. Such PCH Empty messages can comprise, for example, as many as 17 octets per frame of data space which would otherwise go unused. In accordance with the Application, data can be transmitted by local service providers 104, using suitable programming, to mobile devices 106 at any time when no paging traffic is otherwise ready for transmission. Such data may then, for example, be stored on the mobile device 106, and processed for display, etc., at a later time.

As, for example, in GSM multicasting PCH Empty messages include 17 unused octets filled with hex '2b' characters as spaceholders (see ETSI 04.08 sections 9.1.22, 10.5.1.4 or their equivalent sections in 3GPP standard), such 17 unused octets can be used instead to transmit communications according to the Application by replacing the hex '2b' characters with content or other data associated with the communications. The use of PCH Empty messages on paging channels illustrates one of the many advantages offered by the Application, namely, the use of free channel space (i.e., radio time not billed or otherwise charged to subscribing users, time otherwise unused on a free radio channel, or time free of call establishment for other content data transmission) or other unused communications capacity to transmit communications according to the Application, and especially to transmit such communications repeatedly. The repeated transmission of such communications is especially advantageous in circumstances where, for example, a particular mobile device 106 is temporarily out of communication with the local service provider, as for example where it is powered off or located in a position not amenable to radio communications (e.g., a 'dead' spot).

As another example, data transmitted by a local service provider 104 to one or more mobile communications devices 106 can be sent at advantageous times, in multiple-channel communications systems, over control channels. For example, it may be especially advantageous to transmit communications according to the Application in conjunction with control signals, including for example regular or periodic control signals sent by any one of local service providers 104, mobile devices 106, and/or servers 102. As, for example, in GSM networks a mobile device 106 can be configured for initiating periodic location updates (e.g., in the network maintained by Rogers Wireless of Toronto, Ontario, every four hours) endlessly, it can provide a significant advantage with minimal impact on signal traffic to uni-cast (i.e., transmit to one or more individually-designated mobile devices 106) the content data that a local service provider 104 or server 102 wants to transmit to a reporting device 106. That is, it can be advantageous for the local service provider or server 104 to uni-cast, after the regular location or other periodic update processing is complete, and before ending the periodic update procedure, to extend the usage of an already-established Stand-alone Dedicated Control Channel (SDCCH) to uni-cast any desired communications to a reporting device 106. Thus local service providers 104 in, for example, GSM systems, are provided with the capability of periodically uni-casting user-specific content data or other communications to specified individual mobile devices 106, or desired groups of such mobile devices, without establishing regular calls for the purpose. This piggybacked uni-casting feature can be utilized by local service providers 104 and/or servers 102 for their configurable and pushable communications as well as for communications related to a mobile user's subscription.

Such piggybacked uni-casting can also be applied, for example, to processes such as power-on, login or registration of mobile devices 106, and radio on/radio off registration. Alternatively, communications according to the Application may be sent in conjunction with, for example, established packet data calls, either on the uplink (sending of packet data from a mobile device 106 to a local service provider 104) or downlink (from local service provider 104 to mobile device 106) sides. It is noted that the establishment of packet data call conditions accounts for more than one-half of the communications time associated with the sending of a wireless message in most current systems. It may be extremely advantageous, therefore, to use existing packet data calls/links for the sending of communications according to the Application, and/or, for example, allowing a mobile device 106 to query or poll a local service provider 104 for the existence of any previously-unreceived messages being held by the local service provider 104.

It can also be advantageous, in systems such as GPRS/EDGE systems using established Temporary Block Flow (TBF) for the communication of carrier content data or other communications during the periodic Routing Area update procedures (which are conducted, for example, every 54 minutes in the Rogers Wireless GPRS network in Toronto, Ontario), to uni-cast communications according to the Application over such TBF links, particularly in conjunction with mandatory management packet data calls required by wireless protocol standards, as for example packet data radio links otherwise routinely sent by local service providers 104 and/or during periods in which the TBF(s) are not otherwise used to the maximum possible extent. This can be especially advantageous since, in many such systems, TBF procedures are provided free of charge to the mobile subscriber and/or to the local service provider.

Many wireless communications systems provide for an exchange of signals between a mobile communications device and a local service provider 104 at a time when the mobile device 106 is turned on or otherwise logs in after a period of inactivity. In many such systems, the signals are transmitted over control channels such as the SDCCHs used in GSM systems, in which layer 3 mobility management modules are used in transmitting data during location registration or power-on/log-in sequences, or periodic location and/or status queries such as are often used in GSM/GPRS/UMTS systems. Communications according to the Application may be sent in conjunction with such signals during power-on or log-in sequences. They may also be sent in conjunction with other control events such as, for example, packet-service procedures such as service attachment sequences and service registration.

The piggybacking of communications according to the Application by transmission in conjunction with control signals can increase communications efficiency in some conditions by transmitting such communications in conjunction with signals sent over already-assigned channels used in periodic management procedures such as location status reports instead of in conjunction with regular control events such as regular communication or call establishment, call maintenance, or call release procedures. As described herein, the sending of communications according to the Application in conjunction with already-assigned channels as part of periodic management procedures can provided improved efficiency in the transmission of data.

Piggybacking of communications can also increase the efficiency of communications through the use, as for example as described herein, of reusable and periodically-available control channels and of extendable and periodically-available packet data flow links.

As will be understood by those familiar with the relevant arts, mobile wireless devices 106 identified for communication with a local service provider 104 can be required to make or update such reports at regular intervals specified by, for example, the local service provider 104. During periods of low activity, or in conjunction with such status queries and/or responses thereto, the local service provider 104 can transmit one or more messages in accordance with the Application over a control or communications channel.

Thus the Application provides data structures suitable for use by a computer system such as a local service provider system 104 in providing to a plurality of wireless communications devices 106 data for display by the wireless devices 106, the data structure comprising fields of predetermined order and format for communicating data useful in controlling the manner in which data provided by the local service provider 104 is displayed on the wireless devices 106, and for providing text or image content to be so displayed.

The Application further provides computer readable code for causing a local service provider 104 to execute processes and provide data transmissions as described herein. As will be readily understood by those of ordinary skill in the art, once they have been made familiar with this disclosure, such code may be provided in a variety of forms. For example, the process shown in FIG. 2, and other processes described herein, may be programmed in C, C++, assembly language, Java, or a number of other languages, or combinations of languages, using known programming techniques.

Thus the Application provides computer usable media having computer readable code embodied therein for causing a computer to process communications with mobile wireless communication devices as disclosed herein.

While the Application has been described and illustrated in connection with preferred embodiments, many variations and modifications as will be evident to those skilled in this art may be made without departing from the spirit and scope of the Application. The Application is thus not to be limited to the precise details of methodology or construction set forth above as such variations and modifications are intended to be included within the scope of the Application. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

What is claimed is:

1. A method for use by a computer system in providing data to a plurality of wireless communications devices for display by the wireless communications devices, the method comprising:

storing a data structure in a non-transitory computer readable storage medium, the data structure comprising fields of predetermined order and format for storing data identifying:
  at least one wireless device to which the data is addressed;
  a class of type to which the data structure belongs;
  a font to be used by the at least one wireless device in displaying text content communicated by the data structure;
  at least one position in an at least two-dimensional space, the position to be used by the at least one wireless device in displaying data associated with the data structure;
  a size to be used by the at least one wireless device in displaying data associated with the data structure; and
  at least one color to be used by the at least one wireless device in displaying data associated with the data structure;
transmitting the data structure to the plurality of wireless communication devices for display.

2. The method of claim 1, wherein the data structure further comprises at least one field for storing data representing text content to be displayed by at least one of the plurality of wireless communications devices in accordance with the identified font, position size and at least one color.

3. The method of claim 1, wherein the data structure further comprises at least one field for storing data representing graphic content to be displayed by at least one of the plurality of wireless communications devices in accordance with the identified font, position size and at least one color.

4. The method of claim 1, wherein the data structure further comprises at least one field for storing data identifying data representing graphic content to be displayed by at least one of the plurality of wireless communications devices in accordance with the identified font, position size and at least one color.

5. The method of claim 4, wherein the data representing graphic content comprises a visual identifier associated with the local service provider system.

6. The method of claim 1, wherein the data structure further comprises at least one field for storing data representing a duration for which the data for display by the wireless communications devices is to be stored at the wireless communications devices.

7. The method of claim 1, wherein the data identifying a size comprises data representing a percentage of display area of the wireless communications devices to be allocated to the data for display by the wireless communications devices.

8. The method of claim 1, wherein the data identifying at least one wireless device comprises an identifier associated with a group of wireless devices.

9. The method of claim 1, wherein the data structure further comprises at least one field for storing data representing content to be displayed by at least one of the plurality of wireless communications devices, and wherein the non-transitory computer readable storage medium further comprises:

data stored in the data structure, the data comprising at least one oaf size designation, a font designation, a color designation, a display position designation, and content designated by the local service provider system;

programming instructions for configuring a radio device of the local wireless service provider system to transmit the data to a mobile wireless communications device for display by the mobile wireless communications device; the data transmitted on a control channel of a multi-channel communications system in conjunction with at least one control signal.

10. The method of claim 9, wherein the programming instructions further configure the radio device to uni-cast the data from the local service provider to a mobile wireless communications device in a mobility management procedure on an available control channel which is already assigned.

11. The method of claim 9, wherein the multi-channel communications system is operated in accordance with at least one of the Global System for Mobile communication (GSM), Enhanced Data GSM Environment (EDGE), General Packet Radio Services (GPRS), and Universal Mobile Telecommunications Service (UMTS) protocols, and the data is transmitted to the mobile wireless communications device by a layer 3 mobility management module.

12. The method of claim 11, wherein the programming instructions further configure the radio device to uni-cast the data from the local service provider to the mobile wireless device in conjunction with packet data radio links which are already established in a periodic packet service mobility management procedure.

13. The method of claim 9, wherein the at least one control signal comprises a signal associated with at least one of a location registration, power-on, packet service attachment, service registration, and log-in sequence of the mobile wireless communications device.

14. The method of claim 9, wherein the programming instructions further configure the radio device to repeatedly transmit the data to the mobile wireless communications device over the control channel.

15. The method of claim 9, wherein the programming instructions further configure the radio device to repeatedly transmit the data to the mobile wireless communications device using an extendable and periodically-available packet data flow link.

16. The method of claim 1, wherein the data structure further comprises at least one field for storing data representing content to be displayed by at least one of the plurality of wireless communications devices, and wherein the non-transitory computer readable storage medium further comprises:

data stored in the data structure, the data comprising at least one of a size designation, a font designation, a color designation, a display position designation, and content designated by the local service provider system;

programming instructions for configuring a radio device of the local wireless service provider system to transmit the data to a mobile wireless communications device for display by the mobile wireless communications device; the data transmitted on a paging channel of a multi-channel communications system during a period in which the paging channel would otherwise not be used.

17. The method of claim 16, wherein the programming instructions further configure the radio device to transmit the data in conjunction with an empty space signal.

18. The method of claim 16, wherein the multi-channel communications system is operated in accordance with at least one of the Global System for Mobile communication (GSM), Enhanced Data GSM Environment (EDGE), General Packet Radio Services (GPRS), and Universal Mobile Telecommunications Service (UMTS) protocols, and the data is transmitted to the mobile wireless communications device by a layer 3 mobility management module.

19. The method of claim 18, wherein the programming instructions further configure the radio device to transmit the data in a radio resource management module.

20. The method of claim 16, wherein the programming instructions further configure the radio device to repeatedly transmit the data to the mobile wireless communications device over the paging channel.

\* \* \* \* \*